324-77
11-26-74 XR 3,851,261

United States Patent [19] [11] 3,851,261
Geiger [45] Nov. 26, 1974

[54] MULTIPLE PULSE REPETITION FREQUENCY DECODER

[75] Inventor: Timothy F. Geiger, Kensington, Md.

[73] Assignee: The United States of America as represented by the Secretary of the Army, Washington, D.C.

[22] Filed: June 21, 1973

[21] Appl. No.: 372,139

[52] U.S. Cl. .................. 328/165, 328/37, 324/77 R
[51] Int. Cl. .................. H03k 1/00
[58] Field of Search .... 324/77 R, 77 B, 77 H, 78 D; 328/165, 138

[56] References Cited

UNITED STATES PATENTS 3,720,871 3/1973 Brown .................. 324/78 D

*Primary Examiner*—Stanley T. Krawczewicz
*Attorney, Agent, or Firm*—Saul Elbaum

[57] ABSTRACT

An input signal is comprised of a maximum number of known pulse repetition frequencies. In order to determine which frequency components are present, the input signal is fed to a shift register network. Each frequency component may be decoded when preselected stages of the register network simultaneously store pulses of a particular frequency component, and by parallel feeding the outputs of these stages to a respective coincidence gate, an output is generated at the gate that indicates the presence of the respective frequency component.

2 Claims, 8 Drawing Figures

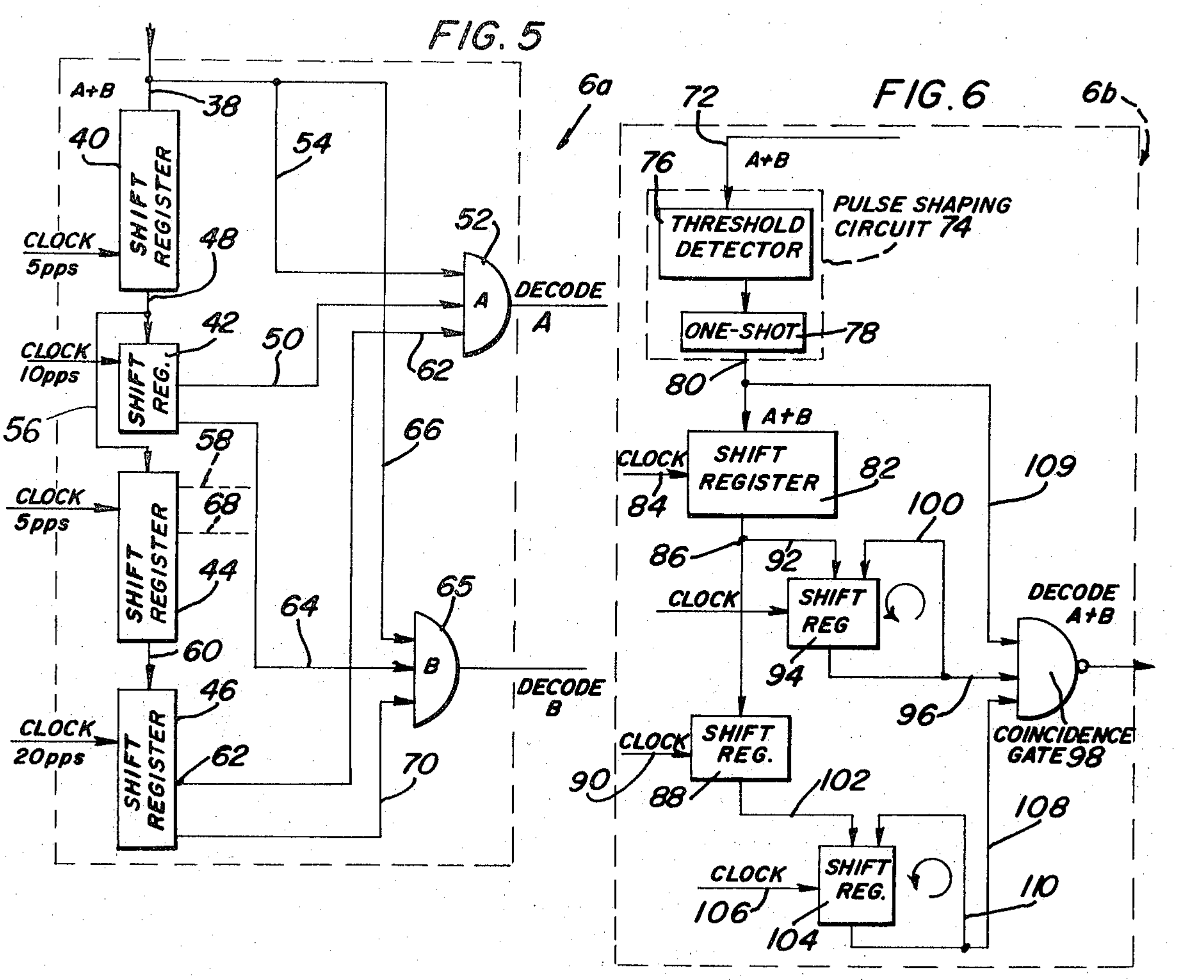
FIG. 5, FIG. 6
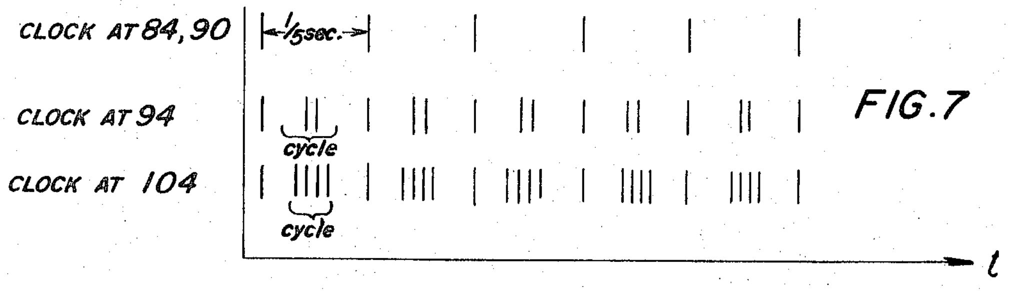
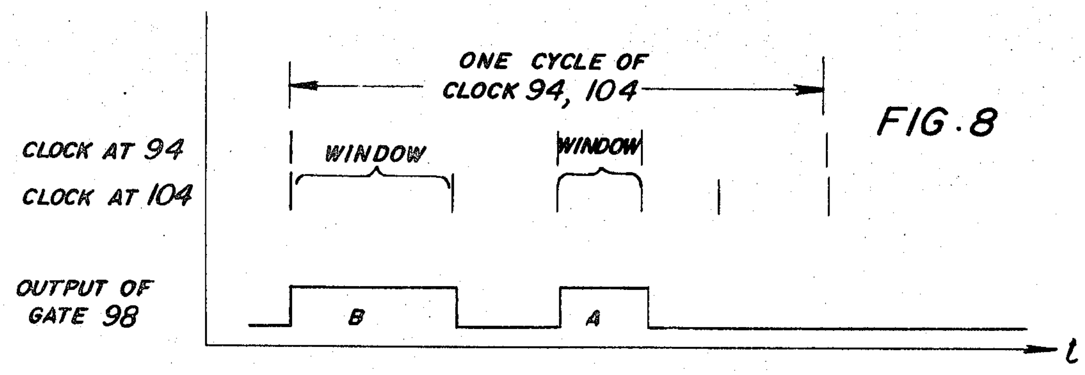

MULTIPLE PULSE REPETITION FREQUENCY DECODER

RIGHTS OF THE GOVERNMENT

The invention described herein may be manufactured, used, and licensed by or for the United States Government for governmental purposes without the payment to me of any royalty thereon.

BACKGROUND OF THE INVENTION

1. Field of the Invention

The present invention relates to digital circuitry for decoding input signals, and more particularly, such a circuit for decoding frequency components of complex input pulse train.

2. Brief Description of the Prior Art

In a number of applications, targets will generate signature frequencies to be picked up by a single sensor. Inasmuch as each signature must be unique, the sensor output is a complex signal containing multiple frequencies. In the past, many of these applications employed analog signals, such as radio transmission. Although satisfactory apparatus exists to decode these analog signals and identify the signature frequencies, the equipment required is generally quite complex. In addition, the analog signals beat together and form unwanted frequency components, such as harmonics. As a result, the decoded output includes erroneous information.

BRIEF DESCRIPTION OF THE PRESENT INVENTION

The present invention utilizes the concept of digital signals for target signatures. The targets generate pulses by such means as blinking lights. A photocell will pick up the pulse information of the various targets in the form of multiple pulse repetition frequencies. It is assumed that the maximum number of these frequencies are known. However, at a given moment, one or more of the targets may not be present in the observation field of view so that its related frequency will not be picked up by the sensor. In order to determine which targets are actually present, digital circuitry is employed to decode the signature frequencies of the sighted target.

The invention utilizes a novel combination of logic to decode an input signal for the purpose of determining the signature frequencies. By virtue of the present invention, a relatively simple and extremely reliable decoder is available which can be completely implemented with presently available integrated circuits.

The above-mentioned objects and advantages of the present invention will be more clearly understood when considered in conjunction with the accompanying drawings, in which:

BRIEF DESCRIPTION OF THE FIGURES

FIG. 5 is a second embodiment of the present invention utilizing simplified shift register components.

FIG. 6 is a third embodiment of the present invention which further simplifies the construction thereof by employing recirculating shift registers.

FIG. 7 is a timing diagram illustrating the relationship between the clock signals employed in the decoder.

FIG. 8 is a timing diagram showing the relationship between the output of the output coincidence gate and the clock signals used in the decoder.

DETAILED DESCRIPTION OF THE INVENTION

Figure 1:
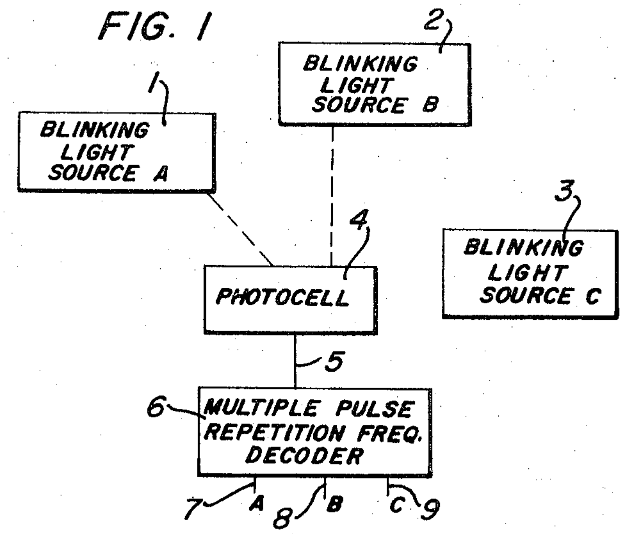
FIG. 1 is a block diagram indicating one environment in which the present decoder can operate.

Referring to the figures, and more particularly, FIG. 1 thereof, one exemplary environment of the present invention is illustrated. As will be noted, a number of blinking light sources 1, 2 and 3 represent targets that generate visual signals at unique frequency signatures. A photocell 4 is positioned to detect the signatures in a preselected field of view. As illustrated in FIG. 1, the photocell will detect the visual output from the sources 1 and 2 but will not detect source 3. Referring to sources 1 and 2 as A and B, respectively, the output of the photocell 4 is indicated along output 5 and frequencies A and B will be present thereat. The present invention is indicated by reference numerals 6 and is generally referred to as a multiple pulse repetition decoder. The decoder has respective output lines 7 and 8 for the frequencies A and B that are present in the input signal. In addition, output 9 of the decoder 6 is available if the blinking source 3, having a frequency C, moves into the field of view.

Figure 2:
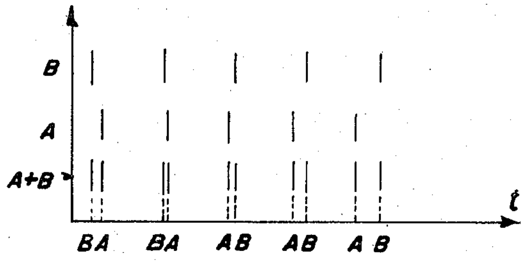
FIG. 2 is a timing diagram showing the relationship between two components of a multiple pulse repetition frequency signal.

FIG. 2 is a timing diagram illustrating the narrow pulse train for frequencies A and B, along with the resultant pulse train from both frequency components. Below the time axis of the time diagram is an indication of the alternating occurrence of A and B at the outputs 7 and 8 of FIG. 1.

Figures 3, 4:
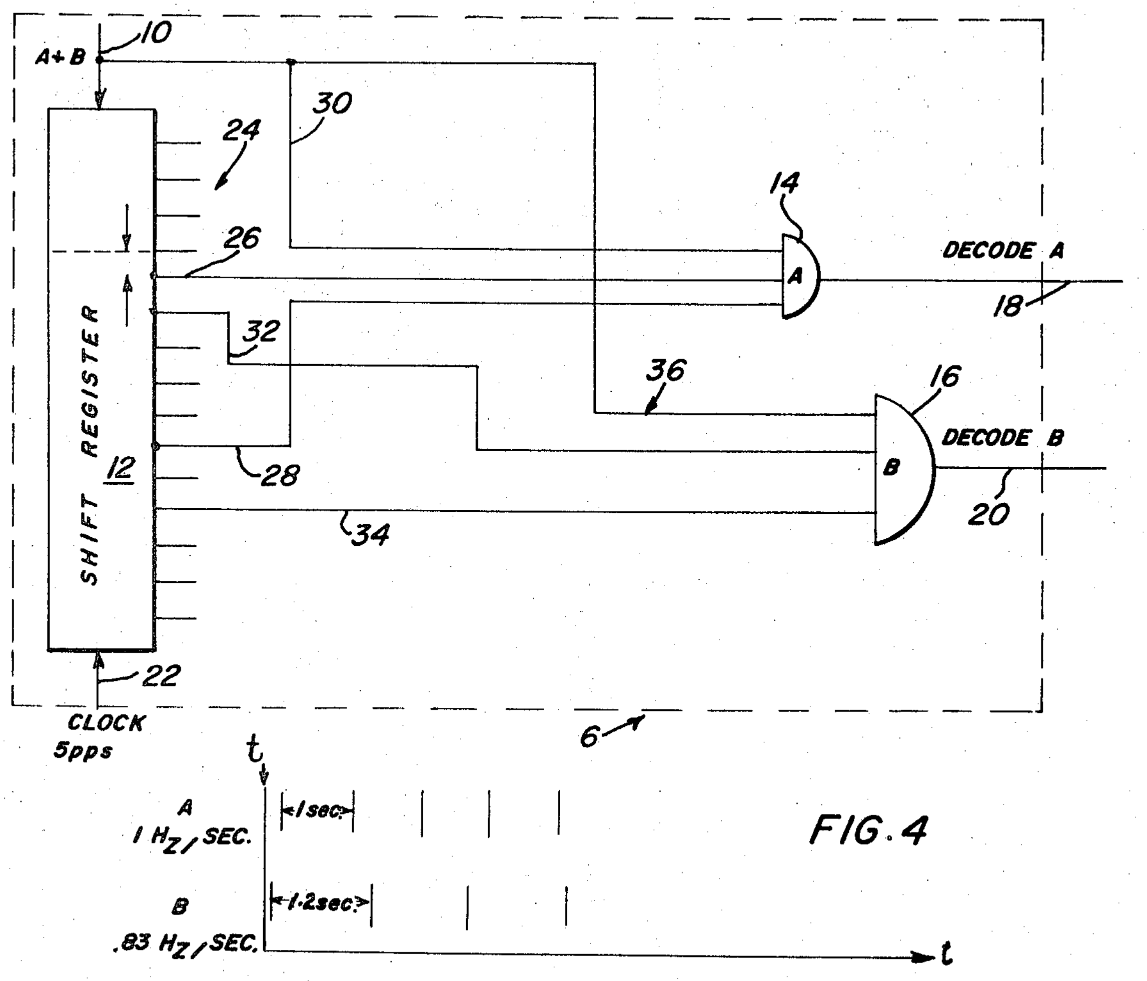
FIG. 3 is a logic diagram illustrating a brute force approach for decoding two frequencies in accordance with the present invention.
FIG. 4 is a timing diagram illusrating the relationship between the exemplified frequency components.

FIG. 3 illustrates a brute force approach for decoding the presence of the A and B frequency components in an input signal. It is to be emphasized that the present description is explained in terms of the two frequency components A and B as being merely exemplary. The system can decode any number of frequency components, and in an actual system, thirty-two frequency components have been effectively decoded. FIG. 3 generally indicates the decoder as reference numeral 6, previously indicated in FIG. 1. The input 10 indicates the input signal to include both frequency components A and B as illustrated in FIG. 2. A relatively long shift register 12 accepts the input in serial fashion as the register is clocked at 22. The register has an output terminal indicated for each stage thereof so that the data stored in the shift register is available for parallel readout. A coincidence gate 14 becomes enabled when the frequency component A is decoded. In a similar fashion, a second gate 16 detects the presence of the frequency component B. The outputs from the gates are indicated by reference numeral 18 and 20.

For purposes of the present invention, the clock 22 is given at 5 pps. By way of example, the frequency component A is chosen at 1 hz/sec. The frequency component B is chosen at 0.83 hz/sec. This means that the A signal will have a period of one second, while the B signal will have a period of 1.2 seconds.

In operation of the circuit in FIG. 3, the A component shifts down to the fifth stage of the register 12 after the first second of operation. This is due to the fact that the clock 22 is established at 5 pps. At the end of a second clock cycle, the pulse that occupies the fifth stage 26 now advances to the tenth stage 28. At the beginning of the third cycle of the A component, the third pulse from the A component will be present at the input line and the interconnected lead 30. Since the inputs to the coincidence gate 14 is respectively connected to the lead 30, the fifth stage 26, and the tenth stage 28, an output will be generated from the gate at 18 which signifies the decoding of the A component.

In order to ascertain the interval between stages necessary for connection to the coincidence gate 14, one multiplies the period of the A component by the clock rate at 22. Thus, in order to decode the B component, one ascertains that the sixth and twelfth stages of register 12 must be fed to comparator 16. The multiple six is established by multiplying the clock rate (5 pps) by the period of the B component (1.2). Accordingly, a lead 32 is connected to the gate 16 and another lead 34 is connected to the twelfth stage of the shift register 12. By connecting input line 36 of the coincidence gate 16 to the input 10, when the third pulse of the B component occurs, the gate 16 will be enabled and the B component will be decoded at the output lead 20. Naturally, if more than two frequency components were present at the input 10, a much longer shift register would be necessary. Therefore, although the embodiment of FIG. 3 might be satisfactory for a small number of frequency components, it would be impractical to implement a shift register, such as 12, for many frequency components.

A simplification of the logic is shown in FIG. 5. As will be appreciated by viewing FIG. 5, a number of shift registers are employed as opposed to a long shift register 12 in FIG. 4. In addition, rather than tapping four stages of register 12, it is only necessary to tap two stages of any of the shift registers shown in FIG. 5. FIG. 5 again illustrates a multiple pulse repetition decoder, which is the subject matter of the present invention. The decoder is generally referred to by 6*a*. Again, the input will, for purposes of example, be assumed to comprise two frequency components A and B, at 38. A first shift register 40 feeds a second smaller shift register 42. It is this shift register that has multiple outputs connected to a coincidence gate. A shift register 44 has its input connected with the output 48 of shift register 40. A final shift register 46 is fed by the shift register 44 along input lead 60. As plainly noted in FIG. 5, each shift register is clocked. All shift registers are clocked by the previously defined clock rate of 5 pps. In accordance with the present invention, the stage capacity of the shift register 40 is defined by the equation: period of highest frequency signal divided by period of clock, minus 1. Thus, as will be seen, the shift register 40 has four stages for the present invention, inasmuch as the previously defined equation would be one divided by 1/5 minus 1 equals 4. Recalling the operation of the circuitry in FIG. 3, it will be remembered that the input 10 along with the fifth and tenth stages of shift register 12 are used as inputs to the coincidence gate 14 that decoded the component A. Inasmuch as FIG. 5 has the first shift register 40 containing only four stages of storage, the output of shift register 40 is connected by lead 48 to a second shift register 42 and by using one stage of this register, the fifth shift between registers 40 and 42 can be made available at lead 50 that inputs to the decoder gate 52. In order to get the tenth shift of the first pulse of the A component, ten stages are needed between input 38 and lead 62, the latter providing the third input to the gate 52. The interposing stages result from shift registers 44 and 46. The jumper 56 links the last stage of shift register 40 with the first stage of shift register 44. Thus, as the first pulse of component A becomes stored in the first stage of shift register 42, it is also stored in the first stage 58 of shift register 44. At this point, the first pulse of the A component has been shifted five times. in order to reach the point where it has shifted ten times, the remaining stages of shift register 44 (three stages) are utilized in addition to two stages of shift register 46. The signal is shifted easily from shift register 44 to shift register 46 by the interconnecting lead 60. The connecting lead 62 shows how the second stage of register 46 is connected to the gate 52.

In accordance with the design criteria of the present invention, the number of stages in shift register 42 is equal to the number of frequency components, in this case two. The stage capacity of shift register 46 is equal to twice the number of frequency components, in our example, this is four.

The ultimate operation in the decoding of frequency component A is the same as previously discussed in connection with FIG. 3. Namely, three successive pulses in the pulse train of frequency component A must simultaneously appear at the input of gate 52.

As in the case of FIG. 3, in order to decode frequency component B, it is necessary to input sequential pulses of this frequency component after detecting coincident occurrence of these pulses at the input, after six shifts, and after twelve shifts. The output after six shifts occurs at lead 64 which utilizes four stages of shift register 40 and two stages of shift register 42. The lead 64 is shown connected to the input of coincidence gate 65 which decodes the frequency component B. Because of the jumper lead 56, the pulse of the frequency component B that appears at lead 64 will also appear at the stage 68 indicated for shift register 44. Thus, in essence, this represents the six shift positions. In order to obtain the twelfth shift position, two stages of shift register 44 are used in addition to the four stages of shift register 46 so that the final stage in the register 46 is connected, via lead 70 to the gate 65. The third and final connection, via lead 66, to the input 38 completes the three inputs to gate 65. It is only after three sequentially spaced pulses in the pulse train of frequency component B, are simultaneously fed to gate 65, that the gate is enabled thus indicating the occurrence of the frequency component B.

FIG. 6 illustrates a further refinement of the invention and is a third embodiment thereof. The embodiment is generally indicated by reference numeral 6b and serves as a multiple pulse repetition decoder.

Again assuming two frequency components A and B present at the input 72, the structure and operation of this embodiment will be explained. However, as in the case of the previous embodiments, the implementation of decoding only two signals is merely exemplary and is in no way meant to be a limitation. In this embodiment, a pulse shaping circuit 74 exists to condition the pulses of the input at 72. It is to be emphasized that the pulse shaping circuit 74 may be used in a similar manner in the previous embodiments shown in FIG. 3 and FIG. 5. Essentially, the shaping circuit 74 includes a threshold detector 76 that subscribes a binary 1 to only those pulses in the input 72 that exceed a predetermined threshold. The output from detector 76 drives a one-shot 78 that stretches input pulses of the frequency components to extend at least one cycle of the clock 84, 90. The output from the one-shot 78 is apparent at 80 and includes a shaped pulse train including the frequency components A and B. This is introduced into the first register 82 that is clocked, in accordance with our example at a rate of 5 pps. The stage capacity of register 82 is the same as registers 40 and 44, previously explained in connection with FIG. 5. For our example, this capacity is four stages. This is an identical design consideration for shift register 88. As in the case of the previous embodiment, it is necessary to obtain an output from the circuitry that makes available the A component pulse after five shifts. In accordance with the circuitry of FIG. 6, four shifts of register 82 is employed in addition to one shift of register 94 that is connected to the output 86 of register 82 by a connecting lead 92. The lead 96 connects the register 94 with the coincidence gate 98 in a manner similar to that previously described in connection with FIG. 5. As in the case of this previous embodiment, a pulse of the A component, after ten shifts, was necessary to be imputed to a coincidence gate. This is obtained by adding the four shifts in register 82 with an additional four shifts in register 88. If two stages of shifting, in register 104 could be employed, then the necessary criterion for operation could be met.

This is achieved by simplifying the circuitry shown in FIG. 5. Rather than utilizing two coincidence gates, as in FIG. 5, a single coincidence gate 98 is used in the embodiment of FIG. 6. However, in order to do this, the shift registers 94 and 104 operate differently from the shift registers 42 and 44. However, again, their purpose is to achieve a delay in the transmission of the frequency components A and B.

In FIG. 6, the two bit shift register 94 has a lead 92 connecting the output 86 of shift register 82 to the first input of the register 94. In accordance with the design criterion of the present invention, the clock at register 94 contains circulation pulses in addition to the primary clock pulses. The register 94 has a recirculating output, which is available in conventional IC chip shift registers. The recirculating output is indicated by loop 100. The output from shift register 94 provides an input 96 of the coincidence gate 98. The output from shift register 88 is connected, via lead 102, to a second four bit shift register 104 that has twice the stage capacity of the shift register 94. Clock 106 which actuates the register 104 circulates the information twice as fast as the clock for register 94. Again, the register 104 has a recirculating output 110. The output from register 104 is connected, via lead 108, to the coincidence gate 98. In operation, the frequency component data stored in the shift registers 94 and 104 fly by for complete recirculation between each single clock cycle of the primary clock at 84 and 90. As a result, coincidence will be detected for both A and B frequencies at the output of coincidence gate 98 during a single primary clock cycle. As in the case of the previous embodiments, the input at 80 is connected, via lead 109, to the coincidence gate 98 so that three sequential pulses in the pulse train of frequency components A and B must be simultaneously present to enable gate 98.

To appreciate the just described operation, in terms of real time, a couple of timing diagrams will be described and should be helpful.

FIG. 7 illustrates the relative disposition of pulses for the clocks in FIG. 6. As will be noted, the clocks at 94 and 104 are marked by and include the pulses of the main clock at 84, 90.

FIG. 8 shows the generation of timing "windows" at the coincidence gate 98. Thus, if a pulse from frequency component B is present during the first indicated wide window, the commensurate output will be generated at the coincidence gate. Similarly, if a pulse is present within the time interval defined by the narrower window, the coincidence gate will react by producing an output indicative thereof. FIG. 8 could represent three signal traces on an oscilloscope if the input to the oscilloscope were connected to points indicated at the clock 94, 104 and the output of gate 98. As a practical matter, the input of coincidence gate 98 is connected to formatting circuitry which is synchronized to the decoder. The formatting circuitry is conventional and takes the form of a demultiplexer. Inasmuch as this is a utilization device that is coupled to the output of the decoder, it is not explained in detail herein. It is to be emphasized that the formatting circuitry can be used in conjunction with the embodiment previously discussed in connection with FIGS. 3 and 5.

I wish it to be understood that I do not desire to be limited to the exact details of construction shown and described, for obvious modifications can be made by a person skilled in the art.

What is claimed is:

1. A system for decoding known components of an input signal having multiple pulse repetition frequencies, the system comprising:

shift register means having its input connected to the signal for shifting the input signal therethrough, the pulses of respective components being stored in different stages of the shift register means at the end of a plurality of cycles of a clock connected to the shift register means;

concidence means respectively connected to a plurality of preselected stages of the shift register means for becoming enabled at the end of a plurality of cycles, said enablement causing the generation of signals indicative of respective components;

wherein the shift register means comprises a first shift register connected to the input signal and having a number of stages equal to the quantity period of highest frequency signal/period of clock − 1;

a second shift register having its input connected to the last stage of the first shift register, the stage capacity of the second shift register equal to the number of frequency components, the second shift register further being clocked with additional pulses for circulation;

a third shift register having the same stage capacity as the first shift register and being clocked at the same rate as the first shift register;

a jumper lead for connecting the last stage of the first shift register to the input of the third shift register;

a fourth shift register having its input connected to the last stage of the third shift register and a stage capacity equal to twice the number of frequency components, the fourth shift register being circulated at a rate equal to twice the circulation rate of the second shift register; and further wherein said coincidence means comprises a plurality of coincidence gates equal in number to the components; and means for connecting preselected stages of the second and fourth shift registers to the gates for enabling the gates in response to the presence of the frequency components in the input signal.

2. A system for decoding known components of an input signal having multiple pulse repetition frequencies, the system comprising:

shift register means having its input connected to the signal for shifting the input signal therethrough, the pulses of respective components being stored in different stages of the shift register means at the end of a plurality of cycles of a clock connected to the shift register means;

coincidence means respectively connected to a plurality of preselected stages of the shift register means for becoming enabled at the end of a plurality of cycles, said enablement causing the generation of signals indicative of respective components;

wherein the shift register means comprises a first shift register connected to the input signal and having a number of stages equal to period of highest frequency signal/period of clock − 1;

a second shift register having its input connected to the last stage of the first shift register, the stage capacity of the second shift register equal to the number of frequency components, the second shift register further being clocked with additional pulses for circulation;

a third shift register having the same stage capacity as the first shift register and being clocked at the same rate at the first shift register;

means for connecting the last stage of the first shift register to the first stage of the third shift register;

a fourth shift register having an input connected to the last stage of the third shift register and further having a stage capacity equal to twice the number of frequency components and a circulation rate equal to twice the circulation rate of the second shift register; and individual feedback means connected between the respective last stage of the second and fourth shift registers and the input thereof to create recirculation of data in the second and the fourth shift registers; and means connecting the last stages of the second and fourth shift register to said coincidence means that particularly includes a single coincidence gate; and means connecting the input signal to the coincidence gate;

wherein the input signal flows between the first and third shift registers at the same clocking rate, the last stage of the first and third shift registers being respectively connected to the second and fourth shift registers which provide additional stages capacity between each cycle of the clock associated with the first and third shift register, the second and fourth shift registers being completely cycled once during each primary clock cycle, and the data stored by the second and fourth shift registers being compared with the input signal at the coincidence gate, the gate being enabled when three consecutive pulses of an expected frequency component occurs.

* * * * *